US006459736B1

(12) United States Patent
Ohta et al.

(10) Patent No.: US 6,459,736 B1
(45) Date of Patent: Oct. 1, 2002

(54) MOVING PICTURE DECODING APPARATUS AND METHOD

(75) Inventors: Mitsuhiko Ohta, Kawasaki; Tadayoshi Kono, Yokohama; Masanori Ishizuka, Kawasaki; Hirohiko Inagaki, Yokohama; Koichi Yamashita, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/093,939

(22) Filed: Jun. 9, 1998

(30) Foreign Application Priority Data

Oct. 30, 1997 (JP) .............................. 9-299140

(51) Int. Cl.⁷ ................................................. H04N 7/12
(52) U.S. Cl. ................................................. 375/240.25
(58) Field of Search ...................... 375/240.25, 240.26, 375/240.13; 348/400.1, 419.1, 423.1, 425.1, 425.4

(56) References Cited

U.S. PATENT DOCUMENTS

| | | | |
|---|---|---|---|
| 5,559,999 A | * | 9/1996 | Maturi et al. ................ 713/400 |
| 5,568,200 A | * | 10/1996 | Pearlstein et al. ........ 348/845.1 |
| 5,960,006 A | * | 9/1999 | Maturi et al. ................ 370/509 |
| 5,963,909 A | * | 10/1999 | Warren et al. ................. 705/1 |
| 6,167,083 A | * | 12/2000 | Sporer et al. .......... 375/240.01 |
| 6,295,094 B1 | * | 9/2001 | Cuccia ........................ 348/559 |
| 2002/0051621 A1 | * | 5/2002 | Cuccia ........................ 386/68 |

FOREIGN PATENT DOCUMENTS

| | | | |
|---|---|---|---|
| EP | 0 545 323 | 6/1993 | ............ H04N/5/92 |
| EP | 0 653 888 | 5/1995 | ............ H04N/7/32 |
| EP | 0 713 341 | 5/1996 | ............ H04N/7/50 |
| WO | 95/12277 | 5/1995 | .......... H04N/5/907 |

OTHER PUBLICATIONS

Yasuda, M., et al., "MPEG2 Video Decoder and AC–3 Audio Decoder LSIS for DVD Player", IEEE Transactions on Consumer Electronics, vol. 43, No. 3, aoQt 1997, pp. 462–467.

"Coded Representation of Audio, Picture, Multimedia and Hypermedia Information", Apr. 20, 1992, ISO/IEC JTC 1/SC 29 N147 DIS 11172–1 XP002095816, pp. 132–133.

* cited by examiner

*Primary Examiner*—Vu Le
(74) *Attorney, Agent, or Firm*—Staas & Halsey LLP

(57) ABSTRACT

A moving picture decoding apparatus includes an input part which adds at least one picture tag to a bit stream, having a plurality of pictures, which has been subjected to intraframe or interframe encoding, the picture tag or tags having a value monotonously changing on a picture-by-picture basis, independent of picture content, a buffer memory storing the bit stream and a controller controlling one or more of the plurality of pictures stored in the buffer memory by referring to the corresponding picture tag or tags.

23 Claims, 13 Drawing Sheets

MOVING PICTURE DECODING APPARATUS AND METHOD

BACKGROUND OF THE INVENTION

1. Field of the Invention

The present invention generally relates to moving picture decoding, and more particularly to a moving picture decoding apparatus and method for decoding bit stream data of a moving picture encoded by intraframe encoding and interframe encoding.

2. Description of the Prior Art

The MPEG (Moving Picture Experts Group) standard is known as an international standard related to the image compression scheme, the disclosure of which is hereby incorporated by reference. The moving picture encoding/decoding technique consistent with the MPEG standard is one of the essential schemes in the recent multimedia environment. Now, a variety of moving picture encoding/decoding is developed.

The encoding system based on the MPEG standard employs a variable-length code in which the number of bits forming data after encoding is not fixed but varied. That is, the amount of information per picture obtained after encoding is increased or decreased on the basis of the property of picture. With the above in mind, a decoder temporarily stores picture data in a built-in buffer memory after encoding (such picture data is referred to as bit stream) in order to start the decoding process when a given number of pictures (picture planes or sheets) is stored. If the buffer memory overflows or underflows, the decoder will not operate normally. In order to avoid the above problem, it is required to monitor the amount of data which is currently stored in the buffer memory and thus control the amount of the bit stream to be written to the buffer memory and the amount of bit stream to be read therefrom.

The MPEG standard is silent in the method of controlling the buffer memory. Hence, various buffer memory control methods have been proposed.

FIG. 1 is a block diagram of a conventional moving picture decoding apparatus, which is directed to monitoring, per picture, the amount of the bit stream occupying the buffer memory by using a temporary reference. A bit stream input part 12 is located at the front stage of a buffer memory 11, and a video decoder 13 is provided at the rear stage thereof. The bit stream input part 12 includes a PSC (Picture Start Code) detector 16 and a TR (Temporary Reference) detector 17. A controller 14 controls the bit stream input part 12 and the video decoder 13. The controller 14 includes a picture counter 18, which counts the number of pictures (picture planes).

An operation of the apparatus shown in FIG. 1 will be given by referring to FIG. 2.

First, at time $t_0$, the controller 14 issues a bit stream request against the bit stream input part 12 in order to store, in the buffer memory 11, data to be decoded, namely, a bit stream supplied from an external storage medium 15. In response to receipt of the bit stream request, the bit stream input part 12 starts to read the bit stream from the external storage medium 15. The bit stream input part 12 extracts a picture start code PSC and a temporary reference TR while reading the bit stream from the external storage medium 15. The picture start code PSC indicates the beginning of the picture layer. According to the MPEG standard, the moving picture data has a hierarchal structure consisting of six layers. Besides the picture layer, the moving picture data has the block layer, macro block layer, slice layer a GOP (Group Of Picture) layer, and sequence layer. The temporary reference TR is a display sequence number assigned to each picture, and is reset at the beginning of the GOP.

FIG. 3 is a diagram showing the concept of the GOP and the temporary reference TR. Each of the GOPs includes a plurality of pictures. For the sake of simplicity, FIG. 3 shows each GOP includes four pictures. The temporary reference TR is a serial number which is assigned to each GOP and starts from "0". The MPEG standard defines an I picture (Intra picture), a P picture (Predictive picture) and a B picture (Bidirectionally predictive picture). Each picture is one of the I, P and B pictures. A GOP header is inserted at the beginning portion of each GOP, and includes a group start code.

It will be noted that the structure shown in FIG. 3 is a frame structure (non-interlace). A field structure (interlace) is known in which one frame consists of an odd field and an even field to which fields an identical temporary reference is assigned.

If the value of the temporary reference TR differs from that of the temporary reference assigned to the immediately prior picture, the bit stream input part 12 informs the controller 14 of detection of picture (time $t_1$ shown in FIG. 2). Then, the bit stream input part 12 writes pictures into the buffer memory 11.

When the controller 14 is informed of the detection of picture, it counts up an internal picture counter 18 (time $t_1$). In the example shown in FIG. 2, the count value is changed from "0" to "1". Subsequently, the controller 14 issues the bit stream request until the picture counter becomes equal to "2".

When the picture counter becomes equal to "2", the controller 14 determines that data to be decoded is available in the buffer memory 11, and stops issuing the bit stream request. Then, the controller 14 issues a decode start instruction (time $t_2$). The video decoder 13, which is in the standby state, receives the decode start instruction, and starts decoding in synchronism with a vertical synchronizing signal VSYNC. At that time, the video decoder 13 sends a picture consumption notification to the controller 14.

In response to receipt of the picture consumption notification, the controller 14 counts down the picture counter 18. In the example shown in FIG. 2, the count value is changed from "2" to "1". When the picture counter 18 becomes equal to "1", the controller 14 issues the bit stream request again (time $t_3$).

The above sequence is repeatedly carried out during the decode process, the controller 14 issues the bit stream request against the bit stream input part 12 and issues the decode start instruction against the video decoder 13 so that the count value of the picture counter 18 is always "2".

The above sequence does not cause any problem in the normal decoding. However, a problem occurs in a decoding other than the normal decoding, such as a quick decoding.

Let us consider a case where only I pictures are decoded in the quick decoding. The bit stream input part 12 discards the P and B pictures and picks up only the I pictures. The above selecting operation refers to the value of a PCT (Picture Code Type), which will be described later with reference to FIG. 5. The PCT indicates whether the encoded data is obtained by using the intraframe encoding or the interface encoding. The I picture (intraframe encoding) is indicated when PCT=1. The P and B pictures are respectively indicated when the PCT is equal to 2 and 3, respectively.

If there is a bit stream in which a group includes only one I picture, the bit stream input part 12 cannot issue the picture detection notification. This is because the value of the temporary reference TR is reset by the I picture located at the beginning of the group and is always equal to "0". Hence, the bit stream input part 12 does not detect a change of the value of the temporary reference TR. Hence, the bit stream input part 12 does not decode a picture to be decoded, and writes the corresponding bit stream into the buffer memory 11. Hence, the quick decoding does not function.

SUMMARY OF THE INVENTION

It is a general object of the present invention to provide a moving picture decoding apparatus and method in which the above disadvantages are eliminated.

A more specific object of the present invention is to provide a moving picture decoding apparatus and method capable of quick-decoding any bit stream.

The above objects of the present invention are achieved by a moving picture decoding apparatus comprising: an input part which provides a picture tag to a bit stream which has been subjected to intraframe or interface encoding, the picture tag having a value monotonously changing on a picture base; a buffer memory storing the bit stream; and a controller controlling a number of pictures stored in the buffer memory by referring to the picture tag.

The above moving picture decoding apparatus may be configured so that the controller refers to the picture tag of a picture written into the buffer memory and the picture tag of a picture read therefrom.

The moving picture decoding apparatus may be configured so that the controller controls the number of pictures on the basis of a difference between the picture tag of a picture written into the buffer memory and the picture tag of a picture read therefrom.

The moving picture decoding apparatus may be configured so that the controller controls the number of pictures so that a difference between the picture tag of a picture written into the buffer memory and the picture tag of a picture read therefrom is equal to or less than a threshold value.

The moving picture decoding apparatus may be configured so that the controller requests the input part to output the bit stream when the difference is less than the threshold value.

The moving picture decoding apparatus may be configured so that the controller allows a read operation of the buffer memory when the difference is equal to the threshold value.

The moving picture decoding apparatus may be configured so that the picture tag has a value which monotonously increases on the picture base.

The moving picture decoding apparatus may be configured so that the input part inserts the pictured tag into the bit stream.

The moving picture decoding apparatus may be configured so that the input part overwrites the picture tag onto a given field of the bit stream.

The moving picture decoding apparatus may be configured so that the given field of the bit stream corresponds to a temporary reference in the MPEG standard.

The moving picture decoding apparatus may further comprise a video decoder which decodes the bit stream read from the buffer memory.

The moving picture decoding apparatus may be configured so that the bit stream is consistent with the MPEG standard.

The moving picture decoding apparatus may be configured so that: the bit stream is consistent with the MPEG standard which defines a temporary reference; and the picture tag has a value only when a value of the temporary reference changes.

The above objects of the present invention are also achieved by a moving picture decoding method comprising the steps of: (a) providing a picture tag to a bit stream which has been subjected to intraframe or interface encoding, the picture tag having a value monotonously changing on a picture base; (b) storing the bit stream in a buffer memory; and (c) a number of pictures stored in the buffer memory by referring to the picture tag.

The moving picture decoding method may be configured so that the step (c) comprises the step of referring to the picture tag of a picture written into the buffer memory and the picture tag of a picture read therefrom.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

First, a description will be given of the principle of the present invention.

As has been described previously, the prior art refers to a change of the value of the temporary reference. Hence, no change of the value of the temporary reference is detected when only I picture is extracted from each group which consists of only the I picture. According to the present invention, a number other than the temporary reference TR is used. For example, a picture serial number other than the temporary reference TR is assigned to the bit stream.

Figure 4:
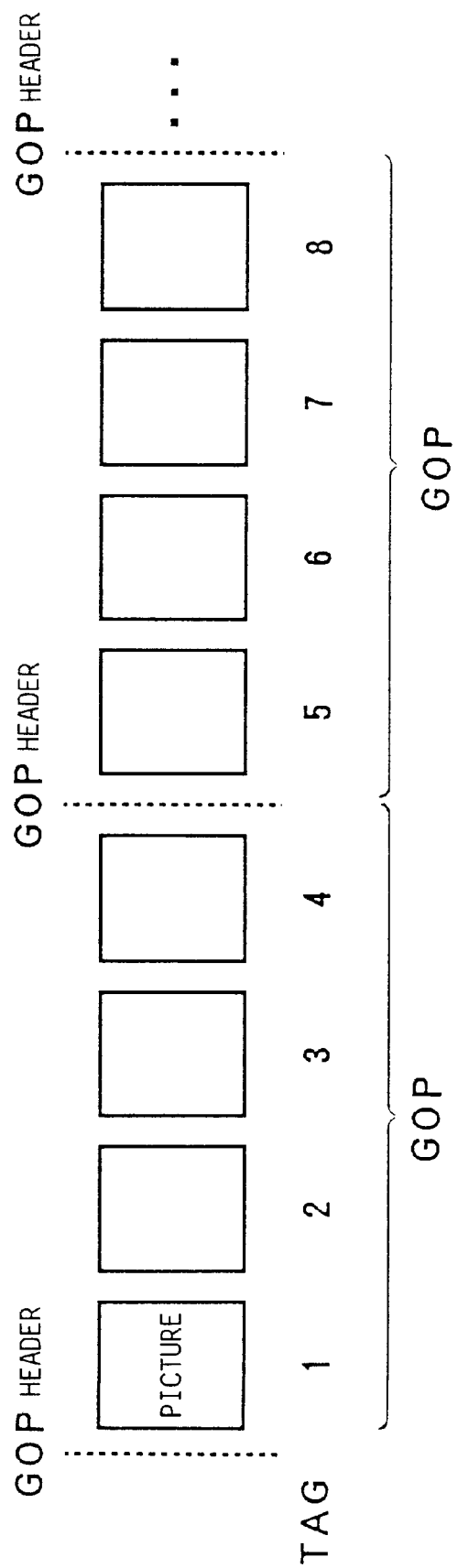
FIG. 4 is a diagram showing the principle of the present invention.

The picture serial number introduced in the present invention is not reset by the beginning picture of each GOP but increases monotonously. In a frame structure shown in FIG. 4, the above picture serial number is depicted as a picture tag TAG. The picture tag TAG is not reset periodically but is designed to serially count the number of pictures over the GOPs. In FIG. 4, the value of the picture tag TAG monotonously increases one by one starting from "1".

As has been described, in the field structure, the identical value of the temporary reference TR is assigned to the two fields (first (odd) and second (even) fields). In this case, the identical value of the picture tag TAG is assigned to the two fields. The value of the picture tag TAG is changed only when the value of the temporary reference TR is changed.

Figure 1:
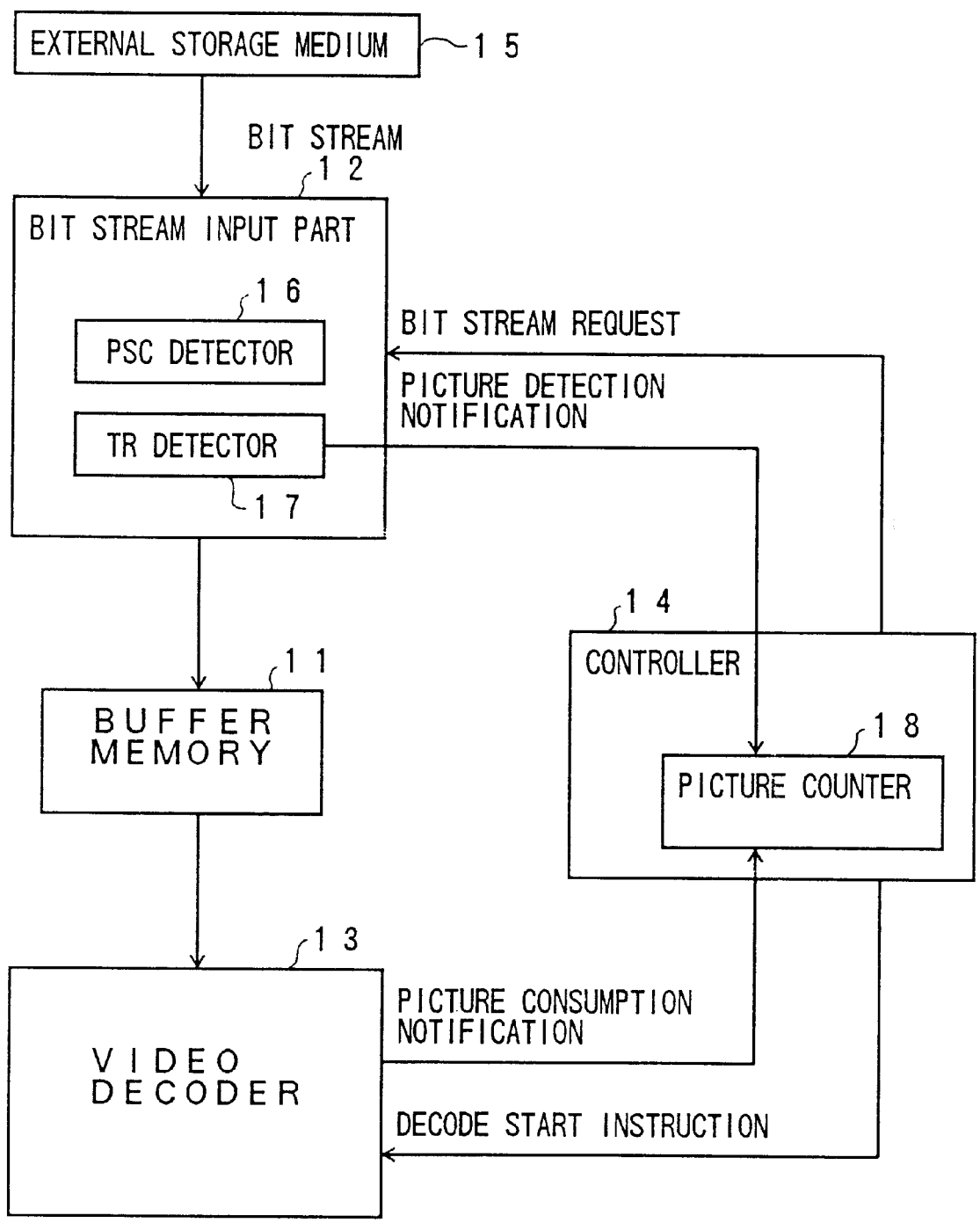
FIG. 1 is a block diagram of a conventional moving picture decoding apparatus.
Figure 2:
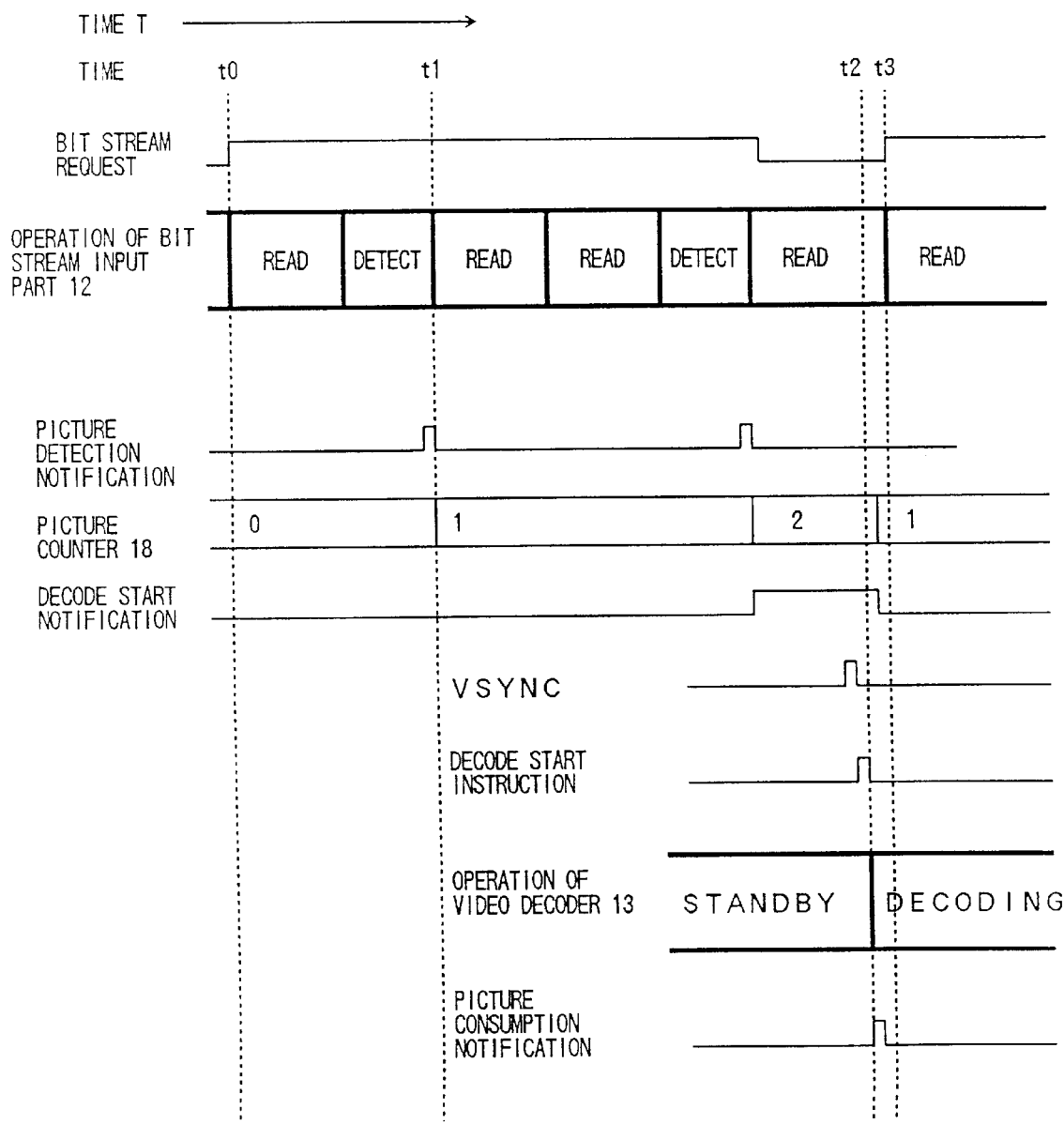
FIG. 2 is a timing chart of the operation of the apparatus shown in FIG. 1.
Figure 3:
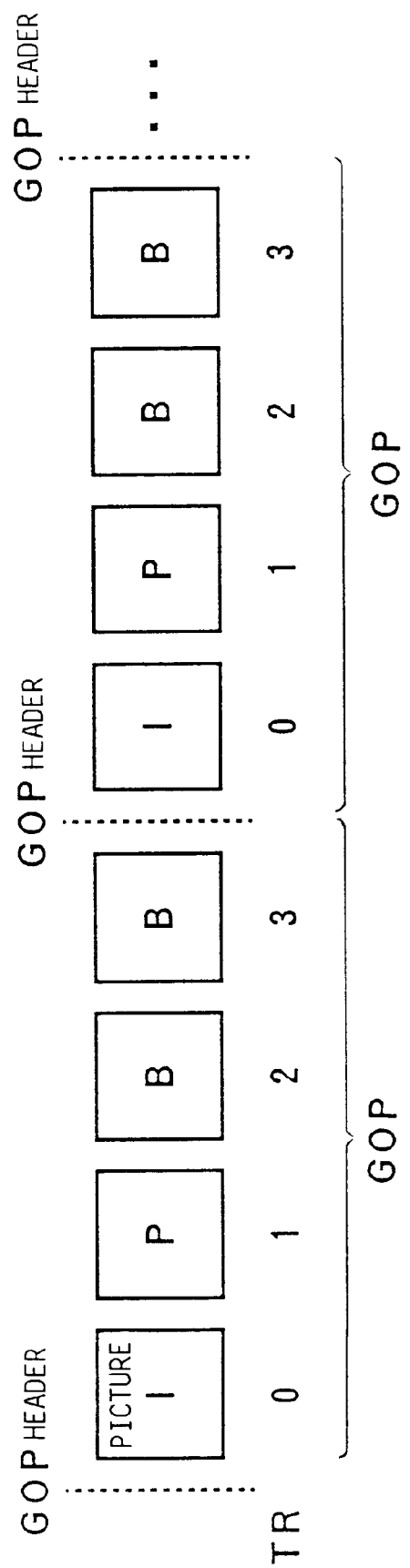
FIG. 3 is a diagram explaining the GOP (Group of Picture) and TR (Temporary Reference)

More particularly, the picture tag TAG consisting of a given number of bytes is inserted immediately after the picture start code PSC by the bit stream input part 12 shown in FIG. 1. Then, the bit stream is written into the buffer memory 11. The above procedure will be described with reference to FIGS. 5A, 5B and 5C.

Figure 5A:
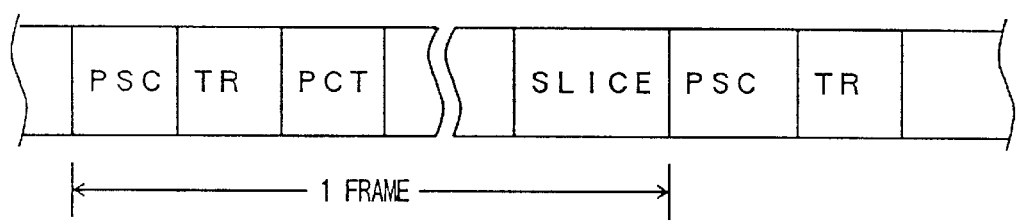
FIGS. 5A, 5B and 5C are diagrams for explaining a picture tag TAG newly introduced in the present invention.
Figure 5B:
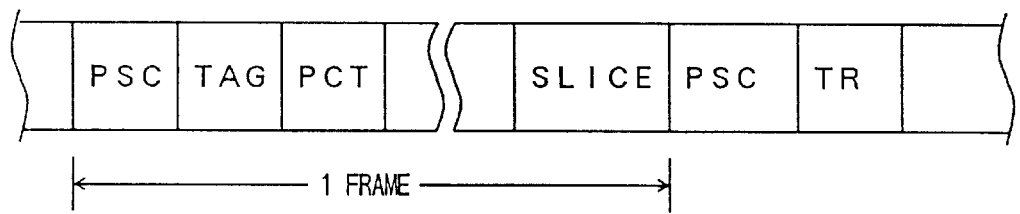
Figure 5C:
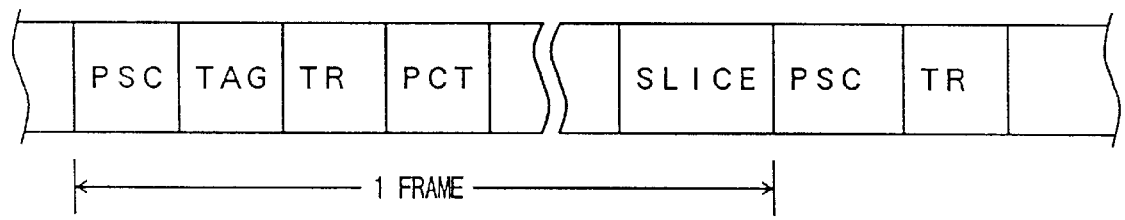

FIG. 5A shows a format of the bit stream consistent with the MPEG standard. FIG. 5C shows a bit stream in which the picture tag TAG consisting of the given number of bytes is inserted immediately after the picture start code PSC. The bit stream input part 12 and the other parts following the part 12 manages the number of pictures by using the picture tag TAG. Hence, it is no longer necessary to consider the periodical resetting of the temporary reference TR in order to manage the number of pictures. A symbol SLICE shown in FIGS. 5A, 5B and 5C denotes slice-layer data.

The picture tag TAG may have the value which decreases monotonously. It is also possible to replace the temporary reference TR by the picture tag TAG by overwriting the picture tag TAG onto the temporary reference TR.

Figure 6:
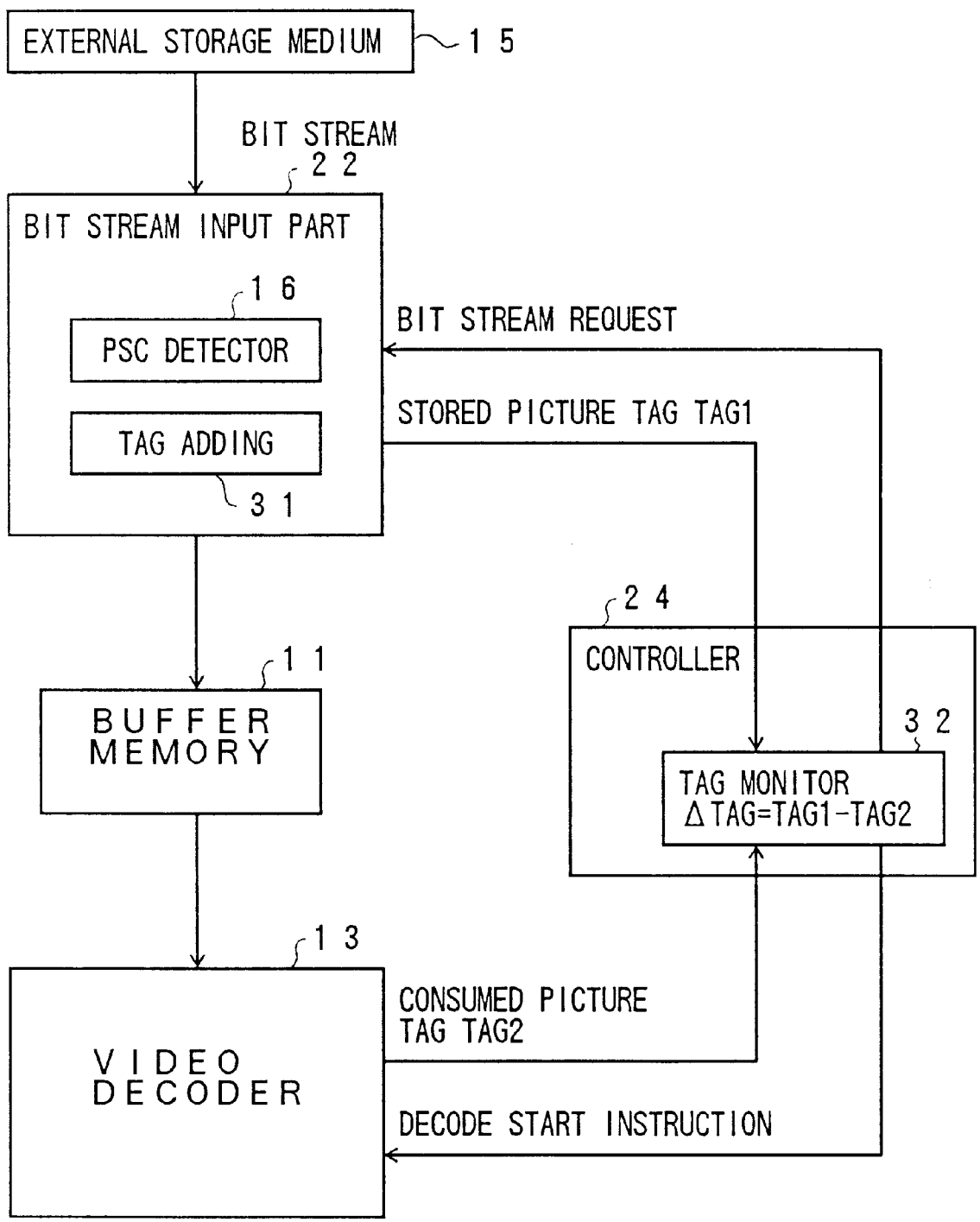
FIG. 6 is a block diagram of a moving picture decoding apparatus according to an embodiment of the present invention.

FIG. 6 is a block diagram of a moving picture decoding apparatus according to an embodiment of the present invention, in which parts that are the same as those shown in FIG. 1 are given the same reference numbers. The apparatus shown in FIG. 6 differs from that shown in FIG. 1 in the following.

First, a bit stream part 22 shown in FIG. 6 is substituted for the bit stream part 12 shown in FIG. 1, and includes a picture tag adding part 32, which is replaced by the TR detecting part 17. Second, a controller 24 shown in FIG. 6 is substituted for the controller 14 shown in FIG. 1, and includes a picture tag monitor 32, which is replaced by the picture counter 18. Third, the bit stream part 22 outputs a stored picture tag TAG1 to the controller 24. Fourth, the video decoder 13 outputs a consumed picture tag TAG2 to the controller 24.

The stored picture tag TAG1 and the consumed picture tag TAG2 are based on the picture tag TAG, which has an initial value of "0", and monotonously increases "1", "2", "3", . . . . In the present embodiment of the invention, the picture tag TAG is inserted immediately after the picture start code PSC as shown in FIG. 5C and is composed of four bytes. The picture tag TAG is used to count the number of pictures.

Figure 7:
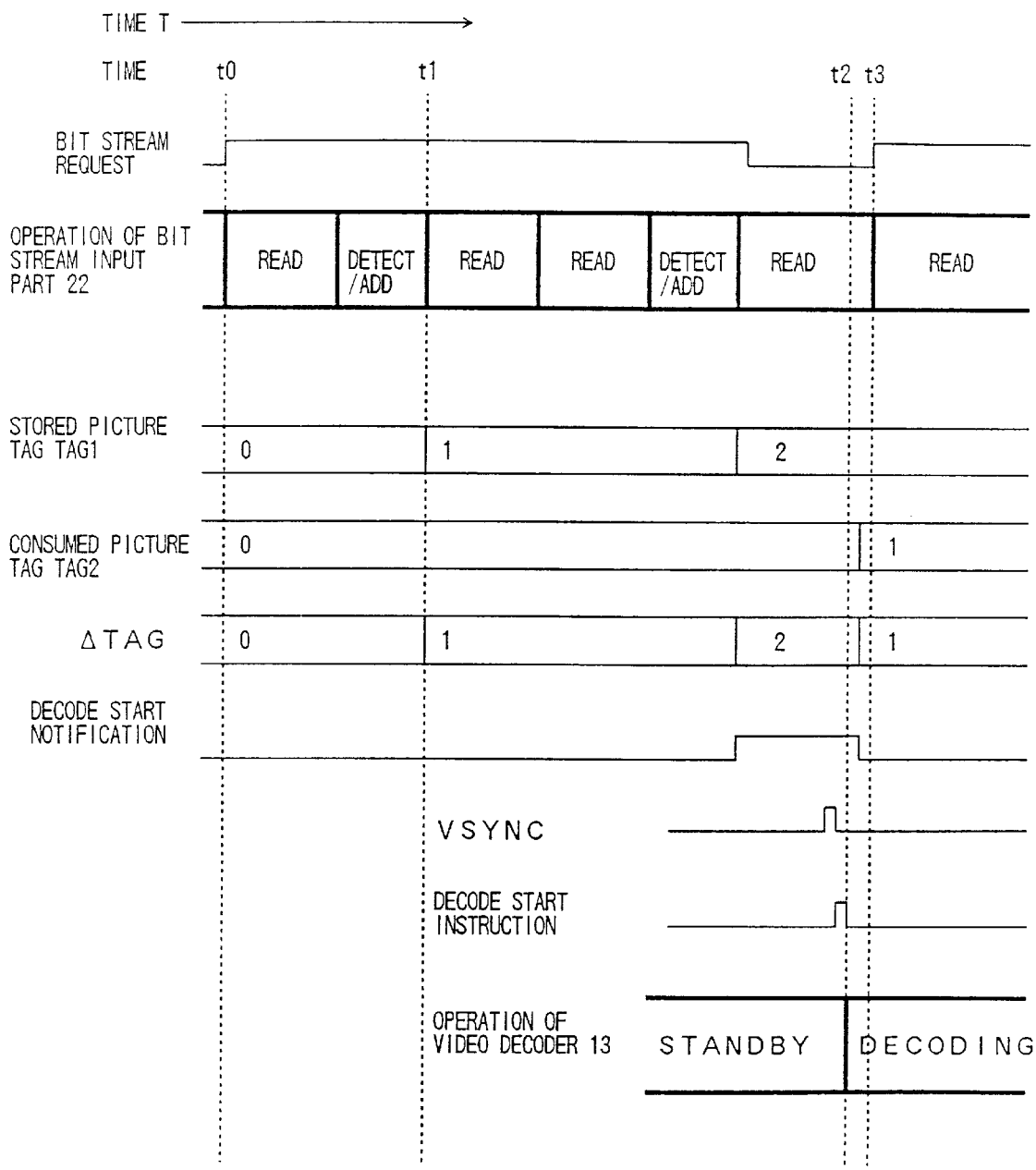
FIG. 7 is a timing chart of an operation of the moving picture decoding apparatus shown in FIG. 6.
Figure 12:
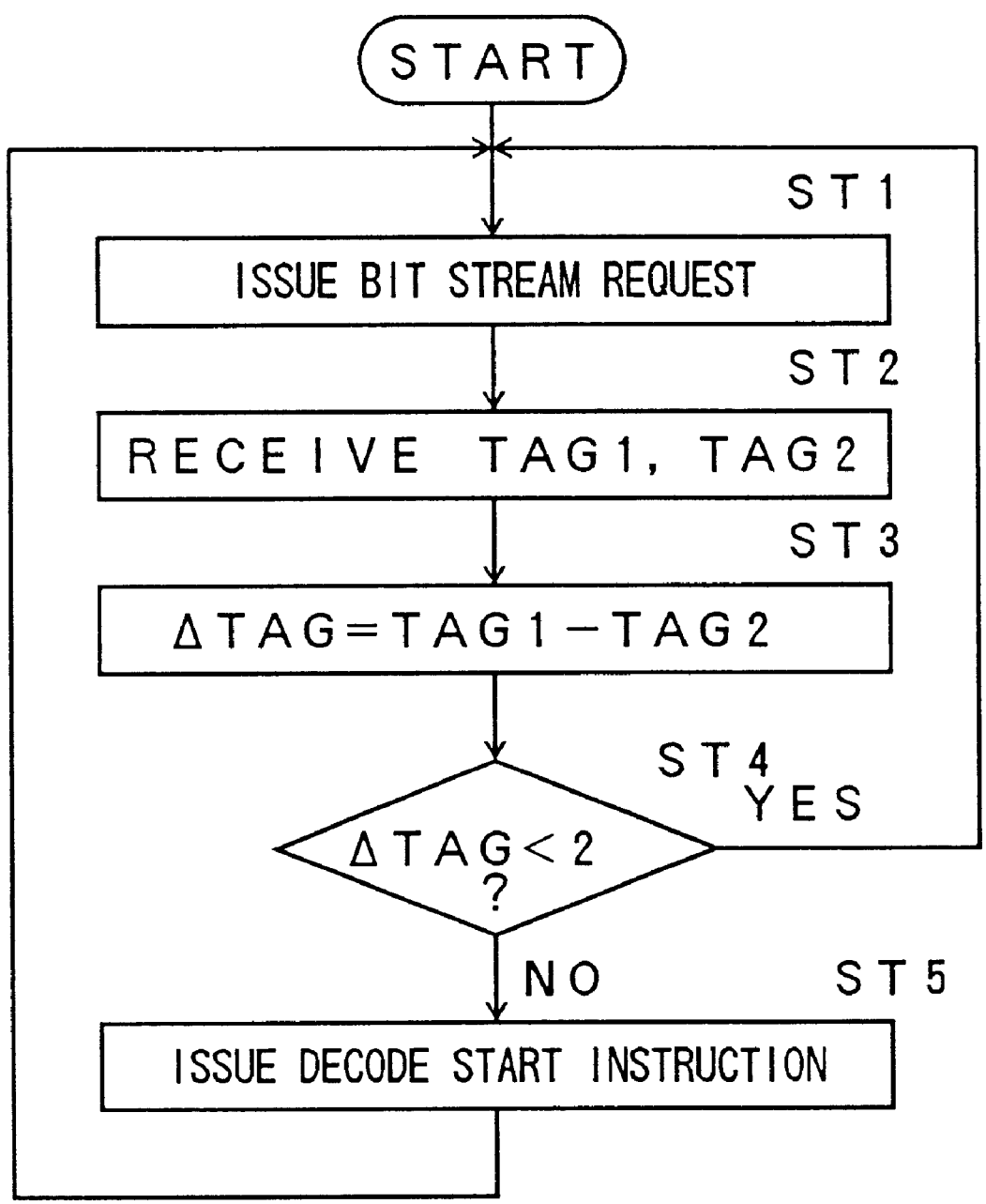
FIG. 12 is a flowchart of an operation of a controller shown in FIG. 8.

A description will now be given, with reference to FIGS. 7 and 12, of an operation of the moving picture decoding apparatus shown in FIG. 6. FIG. 12 is a timing chart of the operation of the moving picture decoding apparatus, and FIG. 12 is a flowchart of a control sequence executed when the controller 24 is formed of a microcomputer, microprocessor or the like.

At step ST1 shown in FIG. 12, the controller 24 issues the bit stream request against the bit stream input part 22 in order to store moving picture data to be stored in the buffer memory 11 (time $t_0$, TAG1=0, TAG2=0). The bit stream input part 22 receives the bit stream request, and starts to read the bit stream from the external storage medium 15.

The PSC detector 16 of the bit stream input part 22 extracts the picture start code PSC from the read bit stream. In the above extracting procedure, the bit stream input part 22 adds the picture tag TAG of four bits to the bit stream so that it follows the picture start code PSC. Simultaneously, the bit stream input part 22 informs the controller 24 of the value of the picture tag TAG as the stored picture tag TAG1 (step ST2). In this case, the picture first received after the picture tag TAG is initialized is assigned the stored picture tag TAG1 of "1" (time $t_1$, TAG1=1, TAG2=0).

The picture tag monitor 32 of the controller 24 monitors the difference delta-TAG between TAG1 and TAG2 at step ST3. The controller 24 repeatedly issues the bit stream request until the difference delta-TAG becomes equal to "2" (the process returns to step ST1 when the answer of step ST4 is YES), which is a threshold value for defining the number of pictures stored in the buffer memory 11. When it is determined that the difference delta-TAG becomes equal to "2", the controller 24 determines that moving picture data to be decoded is now available in the buffer memory 11, and stops issuing the bit stream request. Instead, the controller 24 issues the decode start instruction against the video decoder 13 at step ST5. Hence, it is allowed to read the bit stream from the buffer memory 11.

The video decoder 13 receives the decode start instruction and starts, in synchronism with the vertical synchronizing signal VSYNC, to decode the bit stream read from the buffer memory 11. At that time, the video decoder 13 outputs the consumed picture tag TAG2 to the controller 24. In this case, the consumed picture tag TAG2 is equal to "1" (time $t_2$, TAG1=2, TAG2=1). Since the delta-TAG reduced to "1", the controller 24 issues the bit stream request again. The consumed picture tag TAG2 corresponds to the picture tag TAG of the picture from the buffer memory 11.

The above sequence is repeatedly carried out so that the delta-TAG is always equal to "2" during the decoding operation. That is, the controller 24 repeatedly issues the bit stream request and the decode start instruction against the bit stream input part 22 and the video decoder 13, respectively.

Figure 8:
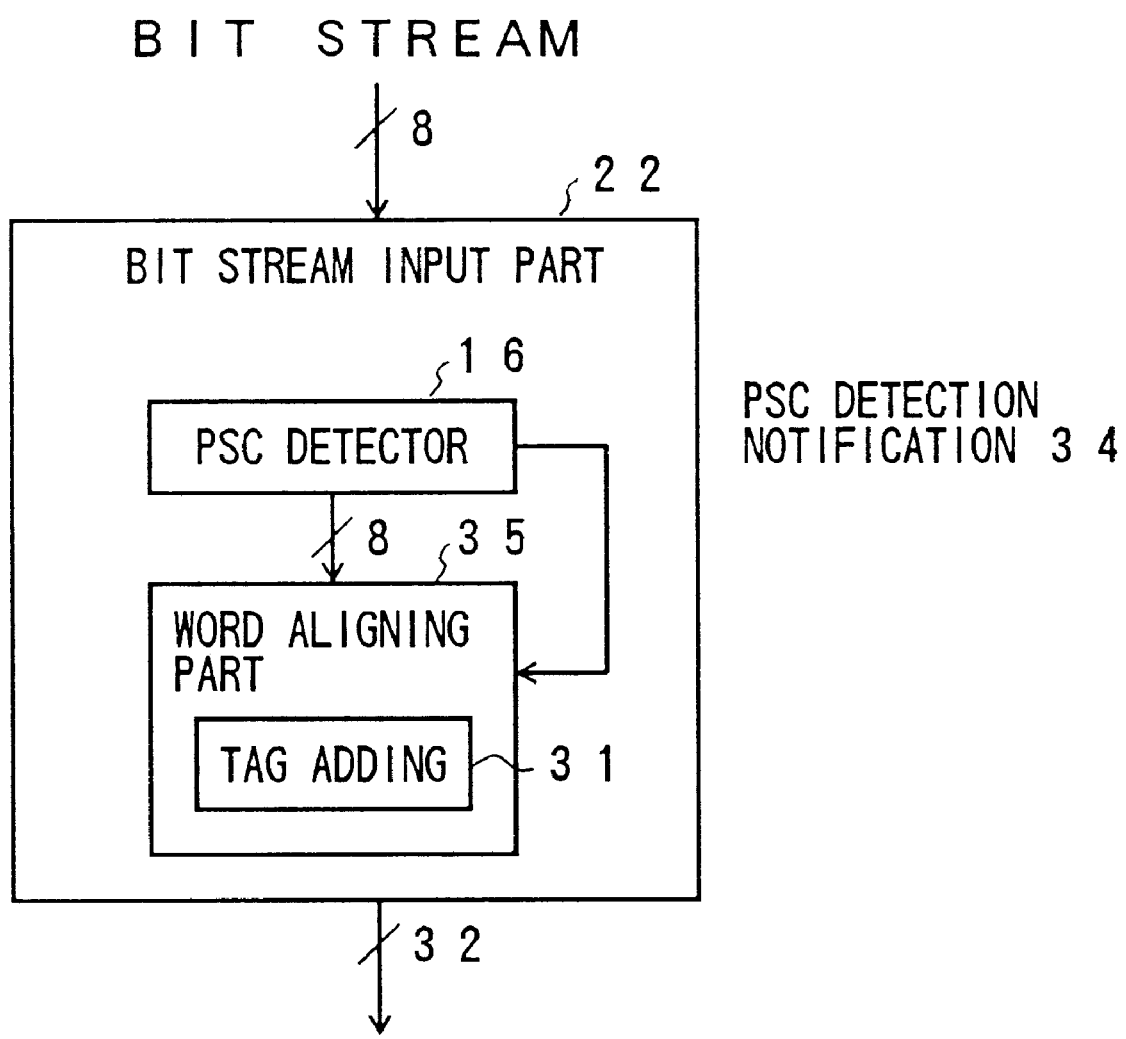
FIG. 8 is a block diagram of a structure of a bit stream input part shown in FIG. 6.

FIG. 8 is a block diagram of the bit stream input part 22, which converts the bit stream data of eight bits into data of 32 bits. The 8 bits-to-32 bits conversion is called a word alignment, and the word-aligned bit stream is called word aligned data. That is, four pieces of data each having one byte (eight bits) are converted into one word (32 bits). The bit stream input part 22 has a word aligning part 35 following the PSC detector 16. The word aligning part 35 adds the picture tag TAG due to the function of a built-in tag adding part 31 while performing the above word aligning conversion.

Figure 9:
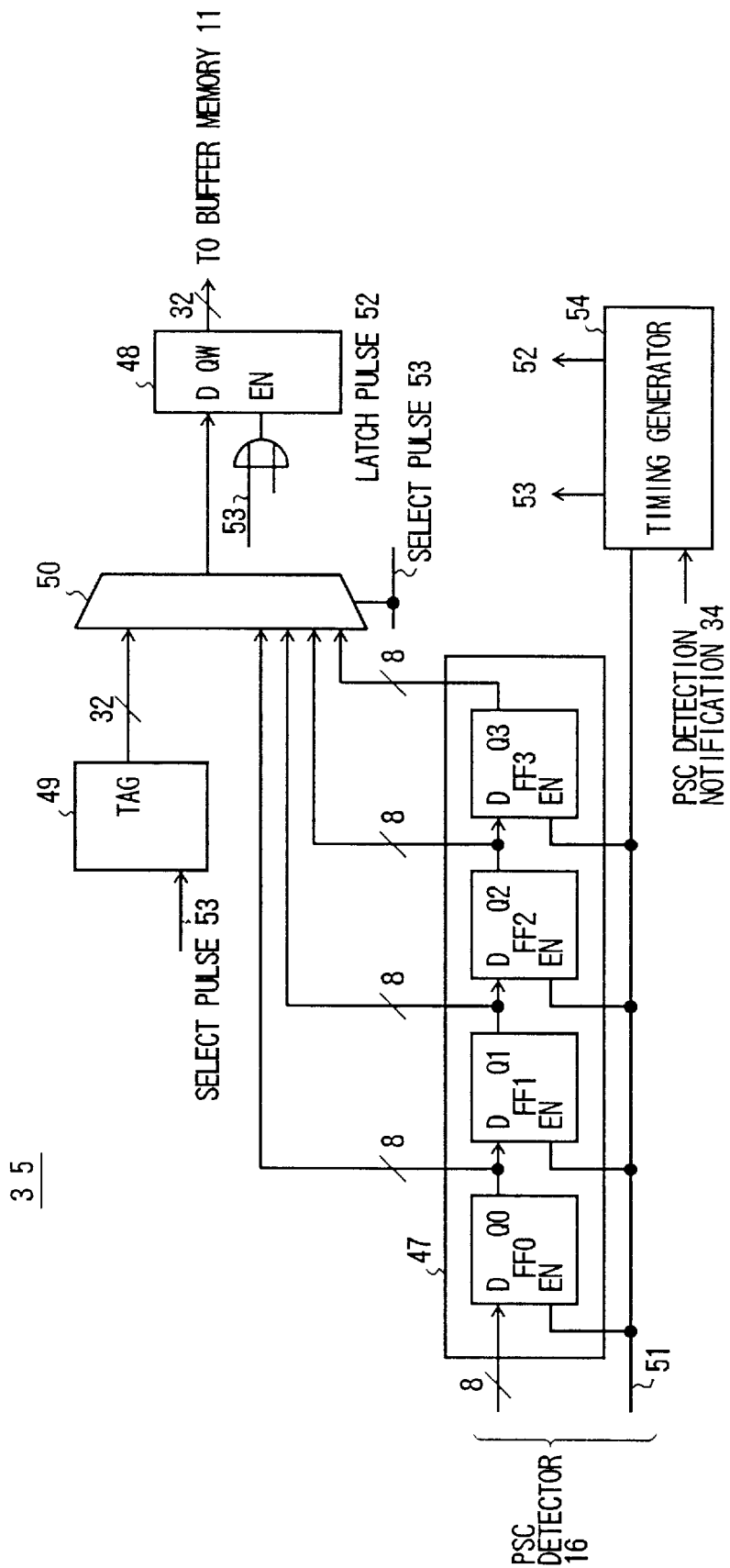
FIG. 9 is a block diagram of a structure off a word aligning part shown in FIG. 8.

FIG. 9 is a block diagram of the word aligning part 35, which includes a shift register 47, a word data register 48, a counter 49 and a selector 50. The shift register 35 is located at the input stage of the word aligning part 35, and has four D-type flip-flops, each having an eight-bit structure. In other words, the shift register 47 is made up of 32 one-bit D-type flip-flop. The word data register 48 is located at the output stage of the word aligning part 35 and stores word aligned data. The counter 49 and the selector 50 are located between the shift register 47 and the word data register 48. The counter 49 functions to generate the picture tag TAG. The selector 50 receives the output signals Q0–Q3 of the respective stages FF0–FF3 of the shift register 47 and the output signal of the counter 49, and selects one signal from among the received signals. Further, the word aligning part 35 includes a timing generator 54, which generates a latch pulse 52 and a select pulse 53 on the basis of a shift pulse 51 from the PSC detector 16 and a PSC detection notification 34.

The shift pulse 51 is applied to enable terminals of the respective stages FF0–FF3 of the shift register 47, and shifts eight-bit data applied to data terminals D thereof. The latch pulse 52 defines the timing at which word data is latched in the word data register 48. The select pulse 53 is used to switch the data selection of the selector 50. When the select pulse 53 is at a low level, the selector 50 selects the output signals of the shift register 47. When the select pulse 53 is at a high level, the selector 50 selects the output signal of the TAG counter 49.

Figure 10:
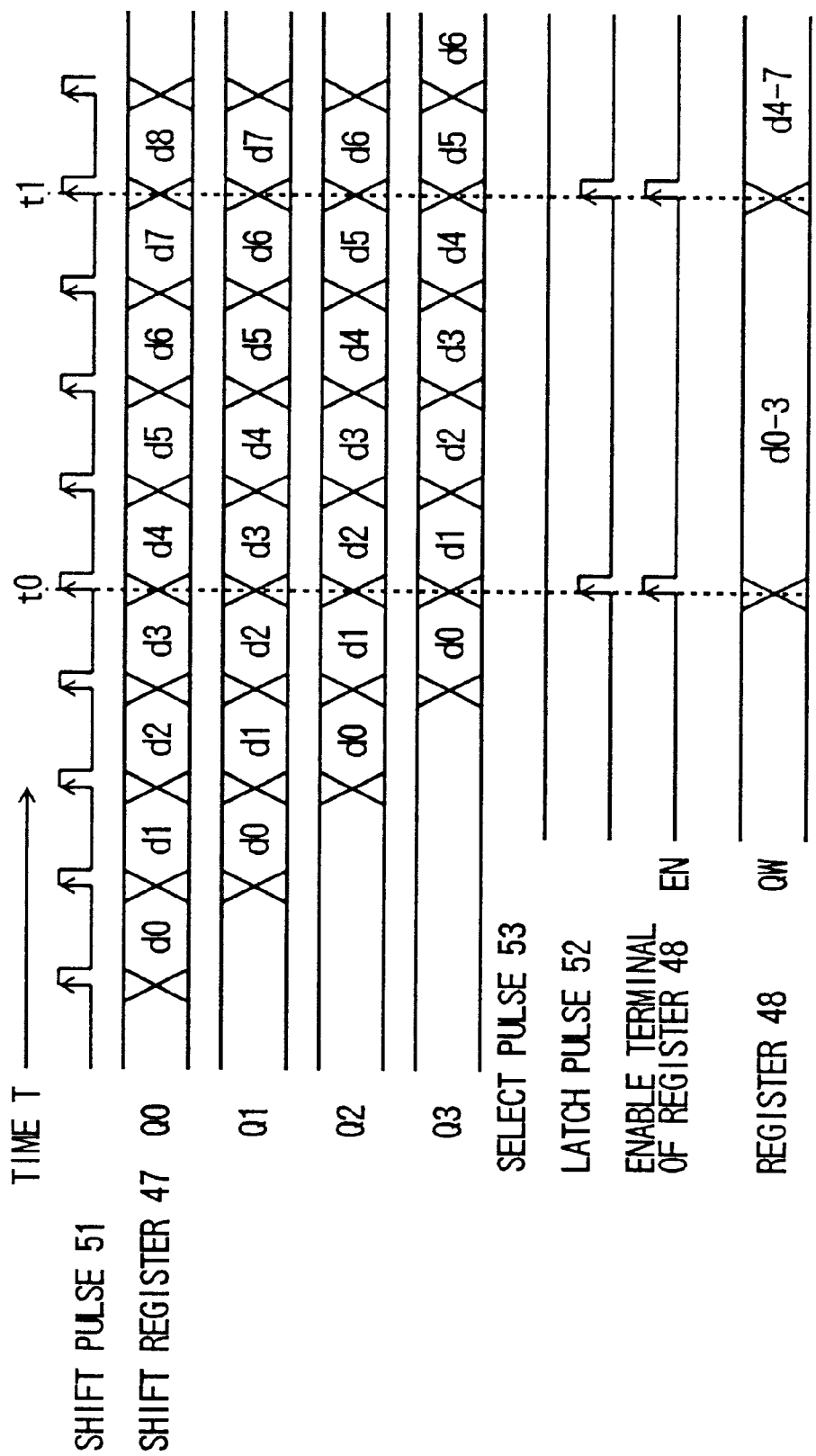
FIG. 10 is a timing chart of a normal operation of the word aligning part shown in FIG. 9.

FIG. 10 is a timing chart of a normal operation of the word aligning part 35 in which the picture tag TAG is not added. The PSC detector 16 detects the picture start code PSC, and generates the PSC detection notification 34. Byte data (part of the PSC) located next to the picture start code PSC is applied to the first stage FF0 of the shift register 47. When the shift pulse 51 is applied four times (four shift pulses), all the stages FF0–FF3 of the shift register 47 have latched data. When the timing generator 54 counts the shift pulse 51 four times (four shift pulses), it generates the latch pulse 52, which is applied to the enable terminal EN of the word data register 48 via an OR gate 55. The word data register 48 stores four pieces of eight-bit data d0, d1, d2 and d3 at time $t_0$. The first four pieces of eight-bit data d0, d1, d2 and d3 corresponds to the picture start code PSC. At time $t_0$, the select pulse 53 is maintained at the low level, so that the output signals of the shift register 47 are always selected. At time $t_1$ when the shift pulse 51 is applied to the shift register 47 four times, the timing generator 54 generates the latch pulse 52, and 32-bit data consisting of pieces of data d4–d7 is stored in the word data register 48.

The above operation is repeatedly carried out, and thus 32-bit word data can be produced from four pieces of byte data.

Figure 11:
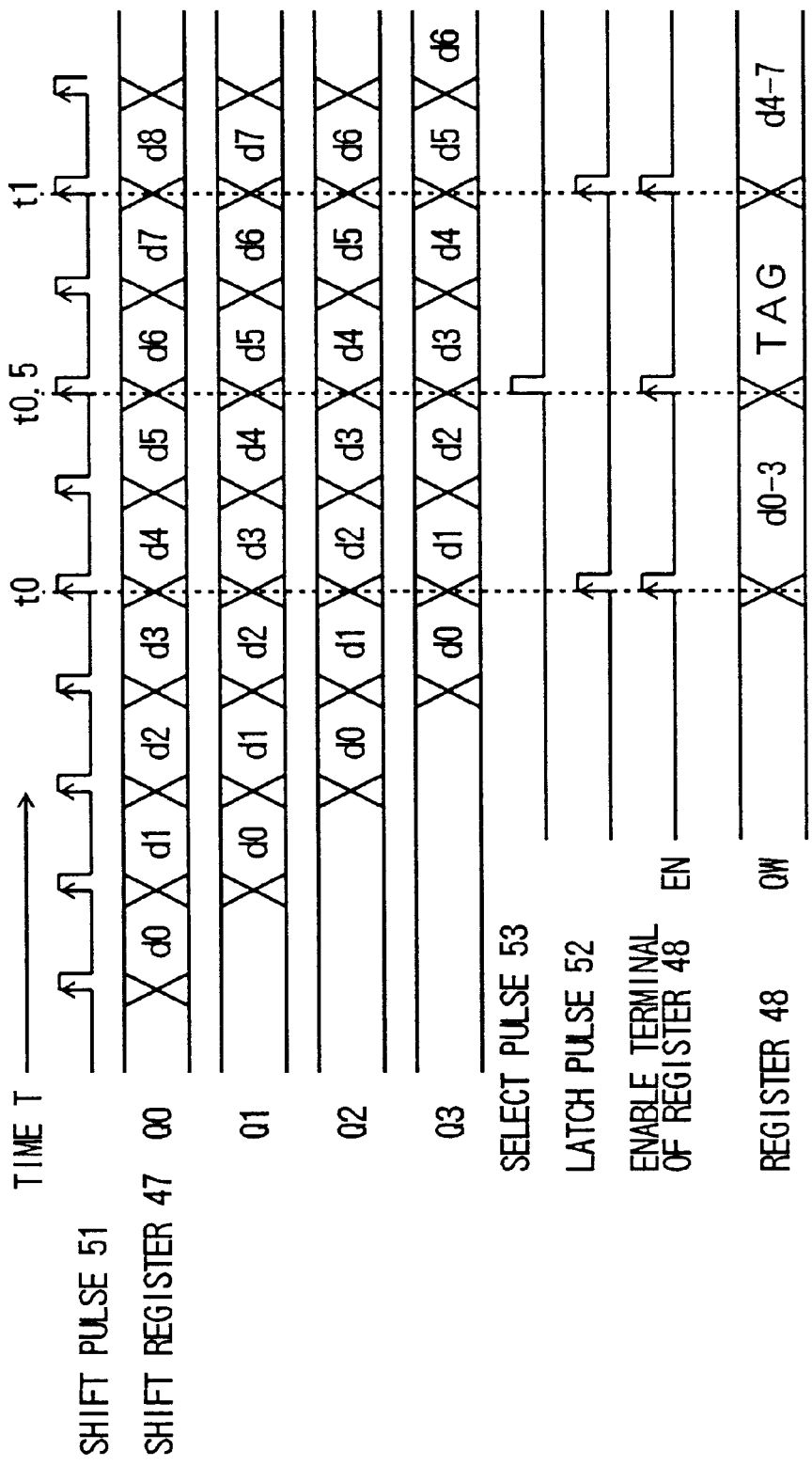
FIG. 11 is a timing chart of another operation of the word aligning part in which the picture tag TAG is added.

FIG. 11 is a timing chart of an operation of the word aligning part 35 in which the picture tag TAG is added. The state observed at time $t_0$ shown in FIG. 11 is the same as that shown in FIG. 10. At time $t_{0.5}$ when the shift pulse 51 is applied twice after the picture start code PSC is detected, the timing generator 54 sets the select pulse 53 to the high level, so that the selector 50 selects the output signal of the TAG counter 49. The TAG counter 49 increments the value of the picture tag TAG by 1 each time the select pulse 53 is received.

The select pulse 53 and the latch pulse 52 are connected to the OR gate 55. Hence, even when the select pulse 53 is switched to the high level while the latch pulse 52 is low, the high-level signal is applied to the enable terminal EN of the register 48, the word data register 48 is activated. Hence, at time $_{0.5}$, the word data register 48 stores the picture tag TAG selected by the selector 50. Then, when the timing generator 54 further receives the shift pulse 51 twice, it generates the latch pulse 52. Hence, as shown in FIG. 5C, the picture tag TAG is added between the picture start code PSC and the temporary reference TR.

By newly defining the picture tag TAG which monotonously changes (increases or decreases) assigned to each picture of the bit stream, the adjacent pictures to be written into the buffer memory 11 are assigned different values of the picture tag TAG. Hence, even if only I pictures are used to reproduce the original picture, the I pictures can certainly be written into the buffer memory 11. The I pictures can be selected by the bit stream input part 22, which refers to the picture code type PCT. In the prior art, even if the I picture is selected, it is not written into the buffer memory 11 until the value of the temporary reference TR changes. In contract, the present invention refers to the newly defined picture tag TAG, and does not have the problem of the prior art.

Figure 13:
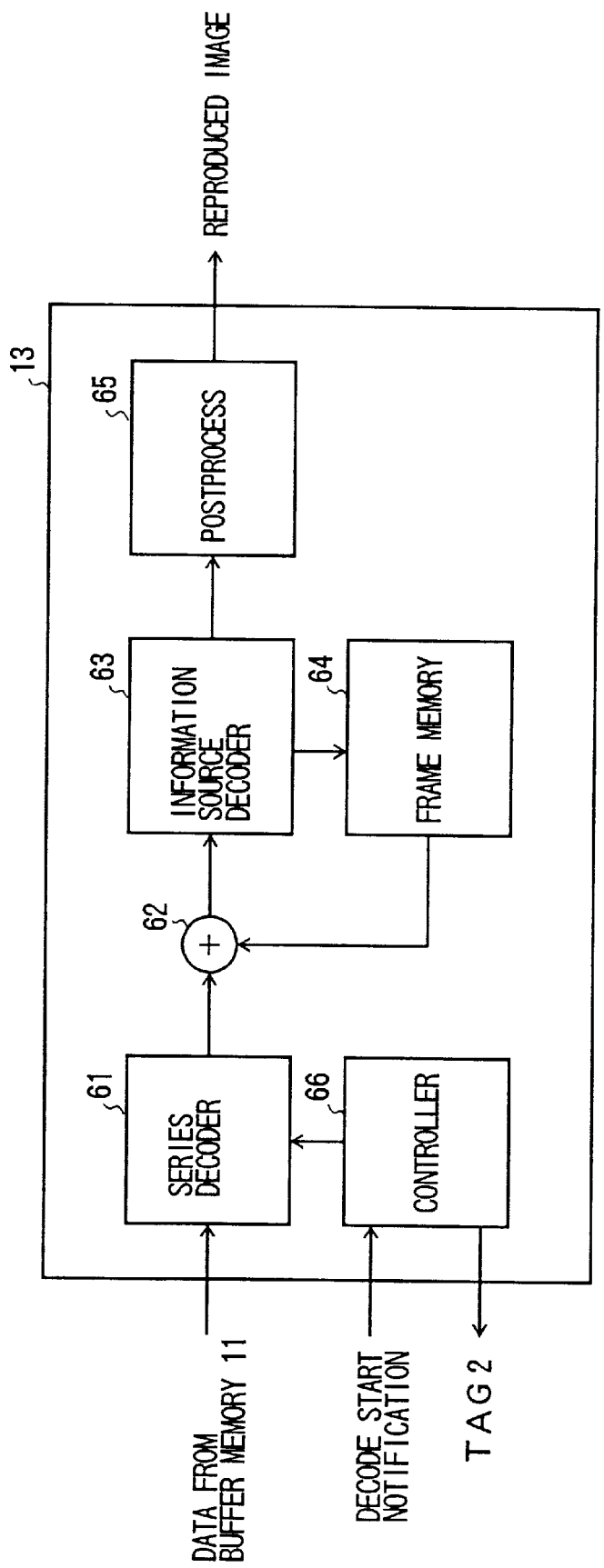
FIG. 13 is a block diagram of a video decoder shown in FIG. 8.

FIG. 13 is a block diagram of a structure of the aforementioned video decoder 13. As shown in FIG. 13, the video decoder 13 is made up of a series decoder 61, an adder 62, an information source decoder 63, a frame memory 64, a postprocessing part 65 and a controller 66. When the controller 66 receives the decoder start instruction from the controller 24, it supplies the series decoder 61 with a signal which starts the series decoder 61 to operate, and sends the consumed picture tag TAG2 to the controller 24. The series decoder 61 decodes the moving picture data encoded by the variable-length encoding (entropy encoding) to thereby reproduce an equal length code, which is applied to the adder 62. The adder 62 adds the equal-length code indicative of the difference between the frames to the frame data read from the frame memory 64, and outputs the added result to the information source decoder 63. Then, the information source decoder 63 performs an inverse DCT (Discrete Cosine Transform) process and a dequantization process, so that data compressed in the time axis can be expanded. The data thus obtained is output to the postprocessing part 65 and the frame memory 64. The postprocessing part 65 performs a conventional postprocessing so that data arranged in the block formation is converted into serial data which produces the original picture.

The above-mentioned embodiment of the present invention employs the arrangement shown in FIG. 5C. Alternatively, it is possible to employ the arrangement shown in FIG. 5B in which the picture tag TAG is overwritten onto the temporary reference TR, which is thus lost. The structure of the bit stream input part 22 to be used when the arrangement shown in FIG. 5B is employed is the same as shown in FIGS. 8 and 9. However, it is required that the timing generator 54 operates in a different manner. When the arrangement shown in FIG. 5B is employed, the timing generator 54 generates the select pulse 53 when receiving the shift pulse 51 eight times (eight shift pulses). Hence, the picture tag TAG is written into the word data register 48 rather than the pieces of data d4–d7 (which correspond to the temporary reference TR).

The threshold value defining the number of pictures stored in the buffer memory 11 is not limited to 2 but may be set equal to an arbitrary number.

The present invention is not limited to the specifically disclosed embodiments, and variations and modifications may be made without departing from the scope of the present invention.

What is claimed is:

1. A moving picture decoding apparatus, comprising:
    an input part which adds at least one picture tag to a bit stream, comprising a plurality of pictures, which has been subjected to intraframe or interframe encoding, the picture tag or tags having a value monotonously changing on a picture-by-picture basis, independent of picture content;
    a buffer memory storing the bit stream; and
    a controller controlling one or more of the plurality of pictures stored in the buffer memory by referring to the corresponding picture tag or tags.

2. The moving picture decoding apparatus as claimed in claim 1, wherein the controller refers to the picture tag of a picture written into the buffer memory and the picture tag of a picture read therefrom.

3. The moving picture decoding apparatus as claimed in claim 1, wherein the controller controls the number of pictures on the basis of a difference between the picture tag of a picture written into the buffer memory and the picture tag of a picture read therefrom.

4. The moving picture decoding apparatus as claimed in claim 1, wherein the controller controls the number of pictures so that a difference between the picture tag of a picture written into the buffer memory and the picture tag of a picture read therefrom is equal to or less than a threshold value.

5. The moving picture decoding apparatus as claimed in claim 4, wherein the controller requests the input part to output the bit stream when the difference is less than the threshold value.

6. The moving picture decoding apparatus as claimed in claim 5, wherein the controller allows a read operation of the buffer memory when the difference is equal to the threshold value.

7. The moving picture decoding apparatus as claimed in claim 4, wherein the controller allows a read operation of the buffer memory when the difference is equal to the threshold value.

8. The moving picture decoding apparatus as claimed in claim 1, wherein the input part inserts the picture tag into the bit stream.

9. The moving picture decoding apparatus as claimed in claim 1, wherein the input part overwrites the picture tag onto a given field of the bit stream.

10. The moving picture decoding apparatus as claimed in claim 9, wherein the given field of the bit stream corresponds to a temporary reference in the MPEG standard.

11. The moving picture decoding apparatus as claimed in claim 1, further comprising a video decoder which decodes the bit stream read from the buffer memory.

12. The moving picture decoding apparatus as claimed in claim 1, wherein the bit stream is consistent with the MPEG standard.

13. The moving picture decoding apparatus as claimed in claim 1, wherein:
the bit stream is consistent with the MPEG standard which defines a temporary reference; and
the picture tag has a value only when a value of the temporary reference changes.

14. A moving picture decoding method, comprising:
adding at least one picture tag to a bit stream, comprising a plurality of pictures, which has been subjected to intraframe or interframe encoding, the picture tag or tags having a value monotonously changing on a picture-by-picture basis, independent of picture content;
storing the bit stream in a buffer memory; and
referring to one or more of the plurality of pictures stored in the buffer memory by
referring to the corresponding picture tag or tags.

15. The moving picture decoding method as claimed in claim 14, wherein the referring to the corresponding picture tag or tags further comprises referring to at least one of a picture stored in the buffer memory and the picture read therefrom.

16. A moving picture decoding apparatus, comprising:
an input part which adds at least one picture tag to a bit stream, comprising a plurality of pictures, which has been subjected to intraframe or interframe, the picture tag or tags having a value monotonously changing on a picture-by-picture basis;
a buffer memory storing the bit stream; and
a controller controlling one or more of the plurality of pictures stored in the buffer memory by referring to the corresponding picture tag or tags wherein the controller refers to the picture tag or tags of at least one of a picture stored in the buffer memory and the picture tag of a picture read therefrom.

17. A moving picture decoding apparatus, comprising:
an input part which adds at least one picture tag to a bit stream, comprising a plurality of pictures, which has been subjected to intraframe or interframe encoding, the picture tag or tags having a value monotonously changing on a picture-by-picture basis;
a buffer memory storing the bit stream; and
a controller controlling one or more of the plurality of pictures stored in the buffer memory by referring to the corresponding picture tag or tags wherein the controller controls the number of pictures on the basis of a difference between at least one of the picture tag of a picture written into the buffer memory and the picture tag of a picture read therefrom.

18. A moving picture decoding apparatus, comprising:
an input part which adds at least one picture tag to a bit stream, comprising a plurality of pictures, which has been subjected to intraframe or interframe encoding, the picture tag or tags having a value monotonously changing on a picture-by-picture basis;
a buffer memory storing the bit stream; and
a controller controlling one or more of the plurality of pictures stored in the buffer memory by referring to the corresponding picture tag or tags wherein the controller controls the number of pictures so that a difference between the picture tag of a picture written into the buffer memory and the picture read therefrom is equal to or less than a threshold value.

19. The moving picture decoding apparatus as claimed in claim 18, wherein the controller requests the input part to output the bit stream when the difference is less than the threshold value.

20. The moving picture decoding apparatus as claimed in claim 19, wherein the controller allows a read operation of the buffer memory when the difference is equal to the hold value.

21. The moving picture decoding apparatus as claimed in claim 18, wherein the controller allows a read operation of the buffer memory when the difference is equal to the threshold value.

22. A moving picture decoding apparatus, comprising:
an input part which adds at least one picture tag to a bit stream, comprising a plurality of pictures, which has been subjected to intraframe or interframe encoding, the picture tag or tags having a value monotonously changing on a picture-by-picture basis;
a buffer memory storing the bit stream; and
a controller controlling one or more of the plurality of pictures stored in the buffer memory by referring to the corresponding picture tag or tags wherein the input part overwrites the picture tag onto a given field of the bit stream and the given field of the bit stream corresponds to a temporary reference in an MPEG standard.

23. A moving picture decoding method comprising:

adding at least one picture tag to a bit stream, comprising a plurality of pictures, which has been subjected to intraframe or interframe encoding, the picture tag or tags having a value monotonously changing on a picture-by-picture basis, independent of picture content;

storing the bit stream in a buffer memory; and referring to one or more of the plurality of pictures stored in the buffer memory by referring to the corresponding picture tag or tags, wherein the referring to the corresponding picture tag or tags further comprises referring to at least one of a picture written into the buffer memory and the picture read therefrom.

* * * * *

UNITED STATES PATENT AND TRADEMARK OFFICE
CERTIFICATE OF CORRECTION

PATENT NO.    : 6,459,736 B1
DATED         : October 1, 2002
INVENTOR(S)   : Mitsuhiko Ohta et al.

It is certified that error appears in the above-identified patent and that said Letters Patent is hereby corrected as shown below:

<u>Title page, Item [54] and Column 1, line 2,</u>
After "METHOD" insert -- THAT CONTROLS BUFFER MEMORY --.

<u>Column 10,</u>
Line 48, change "hold" to -- threshold --.

Signed and Sealed this

Twenty-fifth Day of February, 2003

JAMES E. ROGAN
*Director of the United States Patent and Trademark Office*